United States Patent [19]

Tichy et al.

[11] 4,270,259
[45] Jun. 2, 1981

[54] METHOD AND APPARATUS FOR REBUILDING ADVANCE WEIGHTS

[75] Inventors: Brian N. Tichy, Bloomington; Robert E. Clark, New Germany, both of Minn.

[73] Assignee: Thexton Manufacturing Company, Minneapolis, Minn.

[21] Appl. No.: 20,798

[22] Filed: Mar. 15, 1979

[51] Int. Cl.³ .................. B23P 6/00; B23P 19/04; F02P 1/00; B23B 49/00
[52] U.S. Cl. .................. 29/402.06; 123/146.5 A; 408/75; 206/223; 206/335
[58] Field of Search .......... 29/402.01, 402.04, 402.06, 29/402.09, 402.11, 402.14, 525; 408/1 R, 75, 241 R, 709; 33/180 AT, 181 R, 181 AT; 200/31 CA; 206/223, 335; 123/146.5

[56] References Cited

U.S. PATENT DOCUMENTS

| 3,202,777 | 8/1965 | Scott | 200/31 CA |
| 3,711,927 | 1/1973 | Davidson | 29/402.06 |
| 3,869,803 | 3/1975 | Vaughan | 33/181 AT |

OTHER PUBLICATIONS

"Annealing of Cold-Worked Metal" in Mechanical Metallurgy by G. E. Dieter, Jr. (1961) pp. 153-154.

"Nylons (Polyamides)" in 1969-1970 Modern Plastics Encyclopedia, pp. 154, 159.

Primary Examiner—Charlie T. Moon
Assistant Examiner—C. J. Arbes
Attorney, Agent, or Firm—H. Dale Palmatier

[57] ABSTRACT

Method and apparatus for rebuilding advance weights of a distributor assembly. The apparatus includes a drilling fixture having a hole and a weight-engaging balance pin positioned to one side of the hole, and a stepped pin having a large diameter shank accommodated by the hole in the drilling fixture and a small diameter shank accommodating deformed oblong holes of the advance weights. The method includes positioning the deformed oblong hole of the advance weight on the small diameter shank of the stepped pin establishing the original axis of the original hole, balancing the advance weights against the balance pin, removing the stepped pin, and drilling the deformed oblong holes in the advance weights out to an oversized round hole. Subsequently, the advance weights are reinstalled with a nylon bushing in the bored oversized hole on the pins of the distributor assembly. The apparatus of the drilling fixture and stepped pin can be sold in an over-the-counter kit at auto part stores and repair facilities.

8 Claims, 8 Drawing Figures

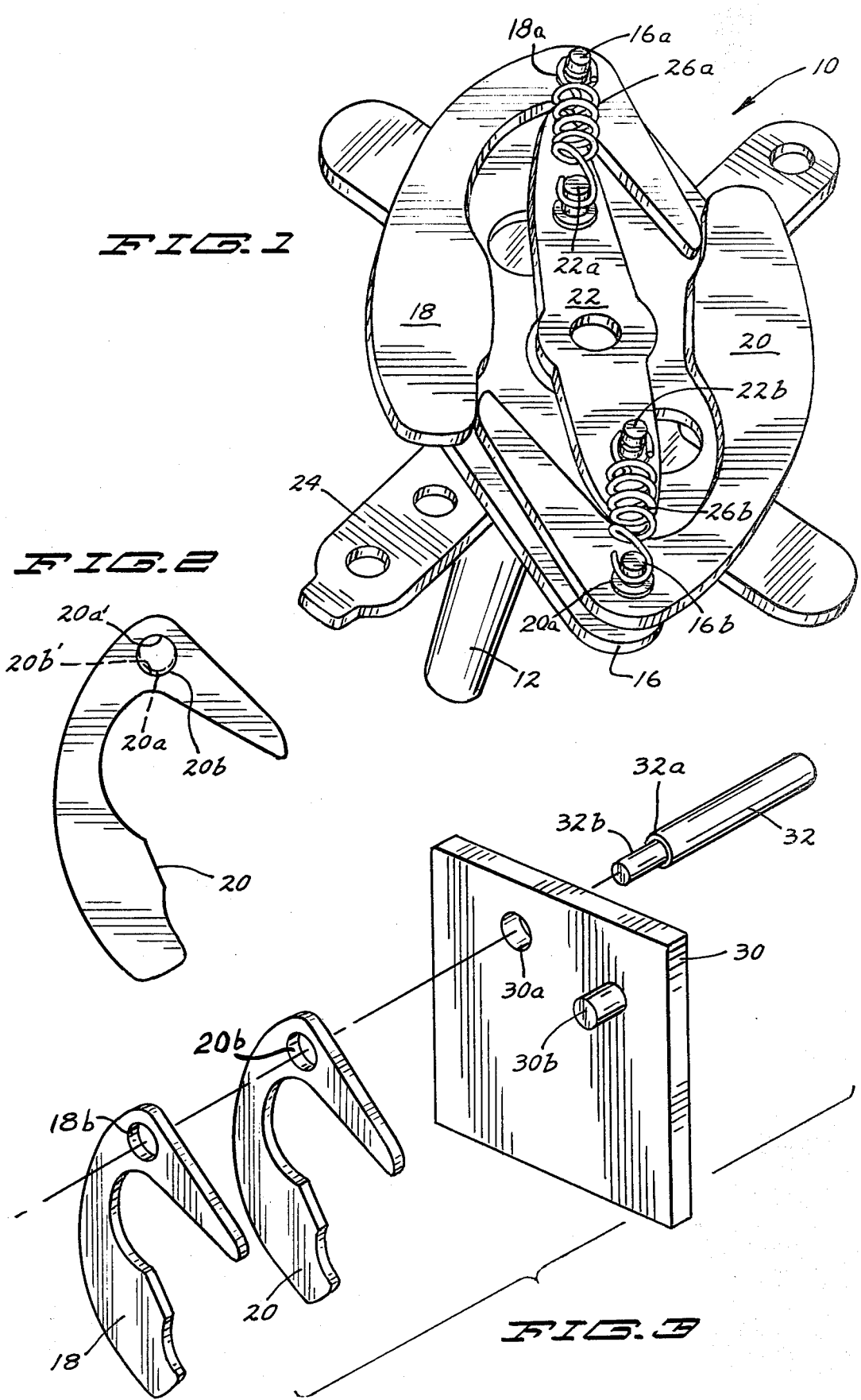

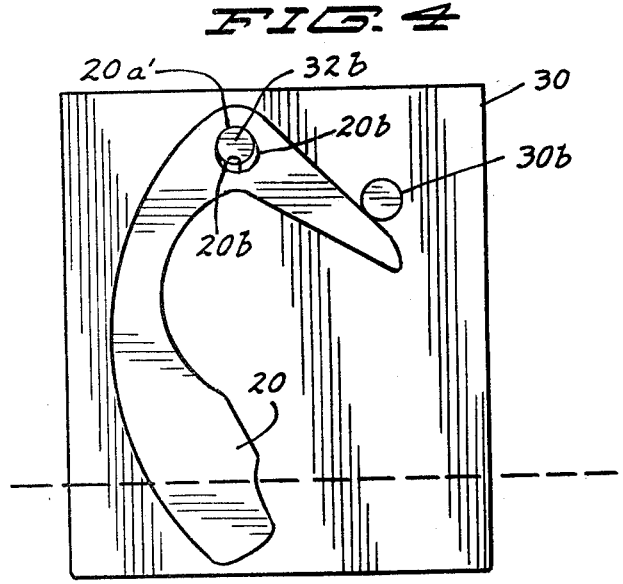
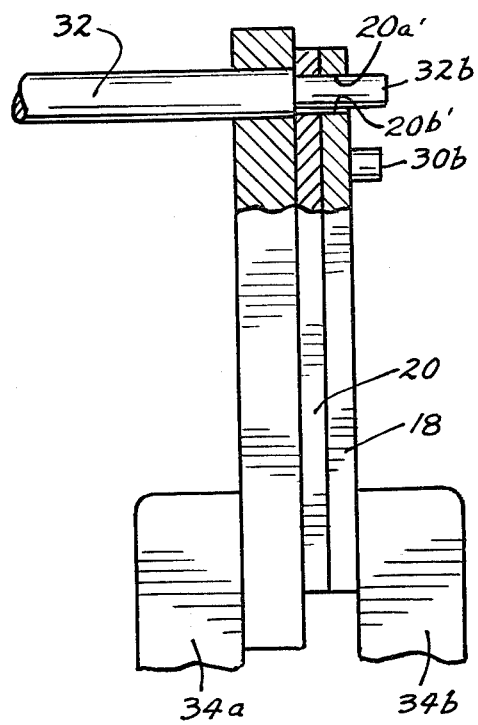
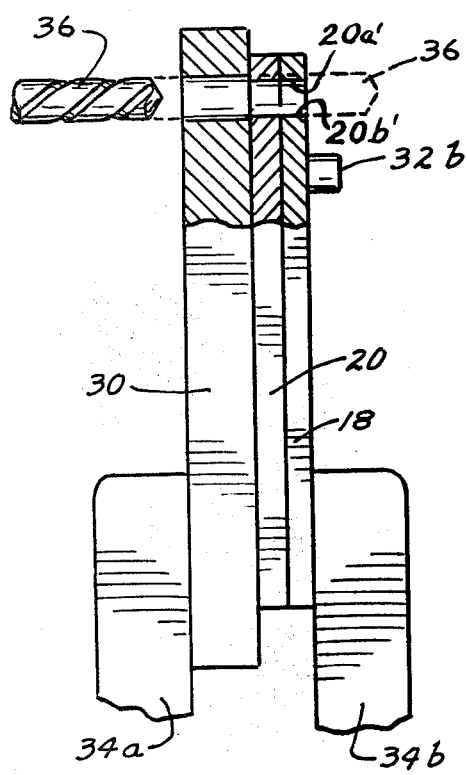
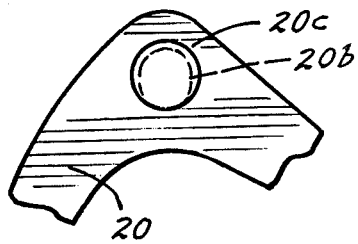
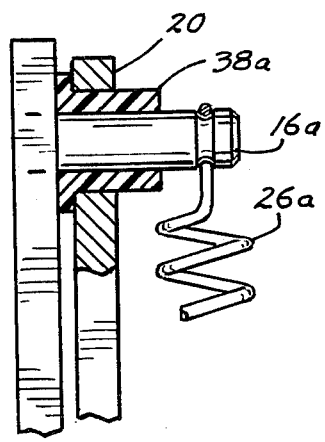

METHOD AND APPARATUS FOR REBUILDING ADVANCE WEIGHTS

BACKGROUND OF THE INVENTION

1. Field of the Invention

The present invention relates generally to automobile distributors, and more particularly, pertains to a method and apparatus for rebuilding advance weights of a distributor assembly.

2. Description of the Prior Art

It is a common practice in the automotive industry that in the repair of a distributor assembly, the distributor assembly is discarded and replaced by an OEM part.

Over prolonged mileage of an automobile, the advance weights which advance the spark in the distributor assembly become worn where the original round holes subsequently become deformed and oblong causing the timing in the automobile to be off. It is a general practice to replace the entire distributor assembly with an OEM assembly and discard the old distributor assembly. Usually, the only reason for the timing being off are that the holes in the advance weights have become worn, deformed, and oblong resulting in the discarding of a Seventy-five Dollar assembly for the wearing of minor inexpensive parts. The original round hole in the advance weight wears and deforms oblong on one side over increasing mileage of the vehicle due to the friction between the pivot pin and the lower periphery of the hole subsequently causing the original round hole to take the shape of the deformed worn oblong hole.

The present invention obviates the foregoing disadvantages of the process of substituting a new OEM part by providing a method and apparatus for repairing distributor weights.

SUMMARY OF THE INVENTION

The general purpose of this invention is to provide a method and apparatus for rebuilding advance weights in a distributor assembly with minimal labor and very minimal cost.

According to one embodiment of the present invention, there is provided a method of rebuilding advance weights including the steps of removing the advance weights from pins of a distributor assembly, annealing the advance weights to facilitate drilling, inserting a stepped pin in a drilling fixture and positioning the larger diameter shank of the stepped pin in the hole of the drilling fixture and the smaller diameter shank extending outwardly from the drilling fixture, positioning two advance weights on the stepped pin and against the weight-engaging balance pin locating the original axis of the original holes, placing the drilling fixture including the centered advance weights in a vise and clamping the same together, removing the stepping pin, inserting an aligned drill through the advance weights so that the drilled holes are the same, cleaning the oversized drilled holes of the advance weights with emery cloth, inserting a nylon bushing into each of the drilled holes, cleaning up the pins with emery cloth and greasing the pins with cam lube, and placing each of the advance weights including the bushings onto the pins whereby the oversized drilled holes including the bushings are centered on the original axis of the original holes on the pins. The apparatus of the invention includes a drilling fixture plate having a hole and an outwardly extending weight-engaging balance pin located at a predetermined distance from the hole centering the original axis of the original hole of the advance weight on the stepped pin.

One significant aspect and feature of the present invention is a method and apparatus for repairing advance weights which can be offered in an over-the-counter kit at automotive parts shops and repair facilities. The kit can be sold at a small fraction of the cost of an OEM distributor assembly.

Having briefly described an embodiment of the present invention, it is a principal object hereof to provide a method and apparatus for rebuilding advance weights. The method can be easily implemented by printed step instructions, and the apparatus requires nothing more than the addition of a clamping device such as a vise, a drill bit, and an electric drill.

An object of the present invention is to provide a method for repairing advance weights which lends itself to implementation in automobile repair garages or automobile dealerships in a short amount of time, and eliminates the need for replacing the distributor assembly with an OEM part.

Another object of the present invention is to provide an apparatus for repair of distributor systems which is relatively inexpensive compared to the cost of the replacement of an OEM distributor assembly and can be used by any unskilled individual with no training. The kit is so inexpensive that it may be disposed of and replaced without having to contend with wear and tear on the parts. The apparatus is not complicated to use and can be used by any unskilled individual.

A further object of the present invention is to provide a kit for practicing the method of the invention and including the apparatus of the invention. A kit would include the drilling jig fixture plate, a stepped pin, bushings, cam lube, and emery cloth. The kit could be packaged in a blister package or small box, and include step instructions necessary to implement the process of the invention.

An additional object of the present invention is to provide a method and apparatus which can be practiced by an unskilled individual having the ability to read, follow instructions, and use a vise and electric drill.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 illustrates a perspective view of a portion of a distributor assembly;

FIG. 2 illustrates a plan view of an advance weight illustrating of the original round hole in dashed lines and the oblong worn hole in a solid line;

FIG. 3 illustrates the stepped pin, the drilling plate, and two advance weights;

FIG. 4 illustrates an advance weight positioned on the stepped pin and resting against the balance pin;

FIG. 5 illustrates the drilling fixture and two advance weights clamped in a vise;

FIG. 6 illustrates the drilling of the advance weights through the drilling fixture;

FIG. 7 illustrates the drill hole in solid line and the worn oblong hole in dashed lines; and, FIG. 8 illustrates a side view of the repaired advance weight and installed bushing on a pin of the distributor assembly.

DESCRIPTION OF THE PREFERRED EMBODIMENTS

FIG. 1, which illustrates a perspective view of a portion of a distributor system 10, shows a distributor shaft 12 including a center shaft 14 and an advance weight base 16. The advance weight base 16 includes two upwardly extending pins 16a and 16b supporting advance weights 18 and 20. A cam 22 frictionally engages with the base 24. Springs 26a and 26b connect the pins 22a and 22b of the cam 22 to the pins 16a and 16b of the advance weight base 16 respectively. When the distributor system 10 is rotating in the engine block, the advance weights 18 and 20 radially pivot around the pins 16a and 16b respectively. Over excessive mileage of the vehicle, prolonged wear, and on account of frictional engagement between the lower periphery of the original round holes and the pins when the advance weights rotate radially outwards around the pins to advance the spark, the original round holes deform taking on an oblong shape at the lower periphery on account of frictional wear.

FIG. 2, which illustrates a plan view of the advance weight 20, shows the original round hole 20a in dashed lines, the top periphery 20a', and a deformed oblong hole 20b in a solid line having a lower periphery 20b' which has become oblong due to frictional wear against and around the pin 16a during rotation of the distributor assembly 10. The upper periphery 20a' has the same arcuate shape as the original hole 20a, but the lower portion of the periphery 20b' of the deformed oblong hole 20b varies considerably from the original shape.

FIG. 3, which illustrates a perpsective view of the apparatus of the present invention, shows a drilling fixture 30 having a flat hard surface including a large diameter hole 30a and an outwardly projecting weight-engaging balance pin 30b spaced a predetermined distance from the hole 30a. The drilling plate 30 is larger in surface area than the surface area of the advance weights for proper support. A stepped pin 32 includes a large diameter shank or body 32a equal to diameter of hole 30a to fit snugly therein, and a small diameter shank or neck 32b having a diameter equal to the original diameter of the hole 20a in the weight to center the advance pins about the hole 30a of the drilling fixture 30. The hole 30a in the drilling fixture 30 accepts large diameter 32a of the stepped pin 32. The small diameter 32b of the stepped pin 32 has a diameter which accepts the upper periphery 20a' of the former round hole of the advance weights 20 and 22 and aligns the advance weights. Accordingly, when the advance weight is supported at the upper periphery 20a' of the hole on the neck 32b of the pin 32, the pin 32 is concentric with the original axis of the original hole 20a. The top periphery 20a' of the original round hole 20a remains unchanged and does not wear. Consequently, the top periphery 20a' is used to locate the original axis. Balance pin 30b is located as to make sure that hole periphery 20a' rests upon the neck 32b of the pin 32 when the fixture 30 is oriented in upright position as illustrated in FIG. 4.

Preferred Mode of Operation

The advance weights 18 and 20 having the deformed worn oblong holes 18b and 20b respectively are removed from the distributor assembly 10 by lifting off the respective springs 26a and 26b, and pulling the advance weights upwards. Next, the advance weights 18 and 20 are annealed by clamping the advance weight in the vise and annealing only the corner of the advance weight around the periphery of the deformed oblong hole. The camming edge of the advance weights will not be annealed as the vise acts as a heat sink.

The stepped pin 32 is inserted into the drilling fixture 30 so that the large diameter shank 32a abuts up to the face of the hole 30a and the small diameter shank extends outwardly beyond the drilling fixture 30. The two advance weights 18 and 20 are positioned on the small diameter shank 32b of the stepped pin 32 at the upper periphery 20a' to establish the original axis of the hole 20a of the advance weights. The interior edge of the advance weights 18 and 20 abuts up against the weight-engaging balance pin 30b as illustrated in FIG. 4 to further balance the advance weights about the small diameter shank 32b of the stepped pin 32 and to make sure the hole periphery 20a' centers about the neck 32b of the stepped pin 32.

The drilling fixture 30 with the advance weights 18 and 20 are clamped together between the jaws of a vise 34a and 34b as illustrated in FIG. 5 and the stepped pin 32 is subsequently removed. The stepped pin 32 insures the location of original axis of the original holes in the advance weights.

A drill 36 drills through the drilling plate 30 and the advance weights 18 and 20 so that the new enlarged holes in the advance plates are identically enlarged about the original axis of the original holes of the advanced weights as illustrated in FIG. 6. The hole 30a in the fixture plate 30 provides for proper alignment of the drill 36 to drill the oversized round hole 20c of FIG. 7 on the original axis of the former round hole 20a.

FIG. 7 illustrates the formerly deformed worn oblong hole 20b in the advance weight 20 and the newly drilled oversized round hole 20c on the original axis of former round hole 20a.

The drilled holes in the advance plates 18 and 20 are subsequently cleaned with emery cloth or a suitable abrasive. A glass-filled graphite nylon material bushing 38 inserts into the newly drilled oversized hole 20c of the advance weight 20 as illustrated in FIG. 8 and likewise for advance weight 18, and has an interior diameter accepting the outer diameter of the pin 16b. Subsequently, the pins 16a and 16b are greased with cam lube, and the rebuilt advance weights 18 and 20 including the bushings 38 are positioned over the pins and the springs 26 are subsequently refastened between the pins 16 and 22 respectively.

The method of the present invention can be printed in a series of numerical steps on a sheet of paper as set forth in the preferred mode of operation, and inserted into a rebuilt kit along with the drilling fixture plate 30 and the stepped pin 32. The rebuilt kit can be a package or box also including a plurality glass-filled graphite nylon material bushings, tubes of cam lube, and emery cloth. The rebuilt kits lends itself to over-the-counter sale in auto parts stores and repair facilities.

The drilling fixture plate 30 can be 1½ × 2" in area and the hole 30a can be one-quarter inches by way of example and for purposes of illustration only. The drill 36 can be a one-quarter inch drill to bore out either 0.158 or 0.189 inch original holes for 0.156 or 0.187 inch pins. The bushings will be sized accordingly to accept the pins and to be accepted by the oversized drill holes in the advance weights.

Various modifications can be made to the present invention without departing from the apparent scope thereof.

Having thus described the invention, what is claimed is:

1. Process for repairing a single deformed worn hole in each of a pair of identical advance weights of a distributor assembly of an automobile comprising the steps of:

a. establishing the location of the axis of the original round hole in each of the advance weights by initially supporting each weight on an unworn peripheral portion of the single hole and upon a round pin with a shape the same as the shape of said unworn peripheral portion, and aligning the two axes of the original round holes of the two weights with each other;

b. enlarging the deformed worn hole to an oversized round hole on the original axis; and, c. inserting a bushing in the oversized hole having an inner diameter equal to the diameter of the original round hole whereby said bushing hole correspond in diameter and on axial center to the original round hole.

2. The process of claim 1 wherein said establishing step comprises the steps of:

a. inserting the round pin having two stepped shank diameters through a hole in a drilling fixture including said hole and a weight-engaging balance pin;

b. positioning the larger diameter shank of said stepped pin in said hole of said fixture;

c. arranging the smaller diameter shank of said stepped pin to project outwardly from said fixtures; and, d. said supporting being accomplished by hanging said advance weights on the smaller diameter end of said stepped pin and orienting portions of said advance weights against said balance pin extending outwardly from said fixture thereby locating the original axis of said original round holes in said advance weights.

3. The process of claim 2 wherein said enlarging step comprises the steps of:

a. removing said stepped pin;

b. inserting a drill bit through said fixture for proper orientation of said drill bit; and, c. boring out said advance weights whereby said oversized board hole is identical in each of said advance weights and on the original axis of said original hole.

4. Process for repairing deformed oblong worn holes in advance weights of a distributor assembly of an automobile comprising the steps of:

a. removing the advance weights from pins of the distributor assembly;

b. clamping said advance weights in a vise;

c. annealing only a corner of said advance weights;

d. inserting a stepped pin having two shank diameters through a hole in a drilling fixture including said hole and a weight-engaging balance pin spaced from said hole;

e. positioning the larger diameter shank of said stepped pin in said hole of said fixture;

f. arranging the smaller diameter shank of said stepped pin to project outwardly from said fixture;

g. hanging said advance weights on the smaller diameter shank and orienting the weights wherein unworn peripheral portions of the holes engage and are supported on the smaller diameter shank of said stepped pin and balancing the ends of said advance weights against said balance pin extending outwardly from said fixture to hold the weights in said orientation and thereby locating the original axis of said original round hole in said advance weights;

h. positioning said fixture plate in a vise with said advance weights balanced thereon and clamping the same together;

i. removing said stepped pin from said fixture plate;

j. inserting a drill bit through said fixture for proper orientation of said drill bit;

k. drilling out said advance weights so that the oversized bored hole is identical in each of said advance weights;

l. cleaning said drilled holes with emery cloth;

m. inserting sized bushings into said oversized bored holes of said advance weights;

n. cleaning said pins of said distributor assembly with emery cloth;

o. greasing said pins with cam lube; and, p. inserting said advance weights including said bushings onto said pins of said distributor assembly whereby said advance weights pivot about said pins on said bushings and said outer diameter of said bushing equals the diameter of said oversized bored hole and said inner diameter of said bushing equals the diameter of the original round hole on the original axis of the original round hole.

5. In combination, a drilling fixture and a stepped pin for rebuilding advance weights of a distributor assembly which weights each have a hole worn into an oblong shape, comprising:

a. the drilling fixture including a flat plate having a hard surface, a hole located in the flat hard surface having a diameter equal to the diameter of the bored advance weights and a weight-engaging balance pin extending outwardly from the flat surface and spaced a predetermined distance from said hole;

b. the stepped pin including a large diameter shank equal to the diameter of the drilled advance weights to the diameter of the hole in the fixture and including a round small diameter shank with a diameter and peripheral shape corresponding to the peripheral shapes of unworn portions of the hole peripheries of the advance weights which establishes location of the original axis of the hole in the advance weights whereby said stepped pin inserts into said drilling fixture plate where said small diameter extends beyond said surface thereby supporting and establishing the location of the original axis of the holes in the advance weights and providing for subsequent drilling of the bored holes in said advance weights, c. and the fixture having orienting means to engage identical portions of the weights on the pin and orient the weight in predetermined orientation relative to the hole.

6. The combination of claim 5 wherein said drilling fixture is slightly larger in area than the surface area of said advance weights.

7. The combination of claim 5 wherein said orienting means includes a weight-engaging balance pin spaced from said hole by said predetermined distance to engage against an interior edge of said advance weights.

8. A kit for repairing advance weights with worn oblong holes of a distributor, comprising in combination:
   a. drilling fixture including a hole and a balance pin;
   b. stepped pin including a large diameter shank to fit snugly in the hole and a small diameter shank to hang the weights therein and upon unworn peripheral portions of the worn oblong holes in the weights;
   c. bushings including an outer diameter corresponding to a bored hole in said advance weights and an inner diameter corresponding to the outer diameter of pins of said distributor assembly;
   d. plurality of cam lube capsules; and,
   e. emery cloth.

* * * * *